US010245879B2

(12) United States Patent
Vadenne et al.

(10) Patent No.: US 10,245,879 B2
(45) Date of Patent: Apr. 2, 2019

(54) MANUAL APPLICATOR

(71) Applicant: SOCIETE BIC, Clichy (FR)

(72) Inventors: Franck Vadenne, Bezons (FR); Arnaud Bez, Garches (FR)

(73) Assignee: SOCIETE BIC, Clichy (FR)

( * ) Notice: Subject to any disclaimer, the term of this patent is extended or adjusted under 35 U.S.C. 154(b) by 505 days.

(21) Appl. No.: 14/906,315

(22) PCT Filed: Jul. 21, 2014

(86) PCT No.: PCT/FR2014/051873
§ 371 (c)(1),
(2) Date: Jan. 20, 2016

(87) PCT Pub. No.: WO2015/011386
PCT Pub. Date: Jan. 29, 2015

(65) Prior Publication Data

US 2016/0159139 A1 Jun. 9, 2016

(30) Foreign Application Priority Data

Jul. 22, 2013 (FR) ..................................... 13 57202

(51) Int. Cl.
*B32B 37/00* (2006.01)
*B43L 19/00* (2006.01)
(Continued)

(52) U.S. Cl.
CPC ............ *B43L 19/00* (2013.01); *B43K 23/008* (2013.01); *B43L 19/0068* (2013.01); *B43M 11/06* (2013.01); *B65H 37/007* (2013.01)

(58) Field of Classification Search
CPC ... B43L 19/00; B43L 19/0068; B43K 23/008; B43M 11/06; B65H 37/007
(Continued)

(56) References Cited

U.S. PATENT DOCUMENTS 6,019,533 A 2/2000 Smith
8,573,279 B2 * 11/2013 Fueki .................. B65H 37/007
156/577

(Continued)

FOREIGN PATENT DOCUMENTS

DE 198 24 552 A1 9/1999
EP 1 627 836 A1 2/2006

(Continued)

OTHER PUBLICATIONS

International Search Report dated Jan. 7, 2016 from PCT/FR2014/051873, 7 pages.

(Continued)

*Primary Examiner* — James D Sells
(74) *Attorney, Agent, or Firm* — Ohlandt, Greeley, Ruggiero & Perle, L.L.P.

(57) ABSTRACT

The invention relates to the field of manual applicators, and in particular a manual applicator for applying a material on a substrate such as a sheet of paper. The manual applicator comprises a housing, an applicator endpiece projecting beyond a front opening of the housing, and a C-shaped handle. In a first section plane and in at least one section plane different from the first section plane and not parallel with the first section plane, the housing presents the same external outline adapted to be pressed into an internal outline of the handle, thereby enabling the handle to be fastened in a first orientation and alternatively in at least one second orientation different from the first orientation, the handle being oriented in the first section plane in the first orientation and in the second section plane in the second orientation. The first and second section planes are substantially in alignment with a longitudinal axis of the housing.

16 Claims, 4 Drawing Sheets

(51) Int. Cl.
*B43K 23/008* (2006.01)
*B43M 11/06* (2006.01)
*B65H 37/00* (2006.01)

(58) Field of Classification Search
USPC .......................................................... 156/579
See application file for complete search history.

(56) References Cited

U.S. PATENT DOCUMENTS

| | | | | |
|---|---|---|---|---|
| 2004/0009027 | A1 | 1/2004 | Gadberry | |
| 2004/0036194 | A1 | 2/2004 | Chadwick et al. | |
| 2006/0032590 | A1* | 2/2006 | Yamashita ......... | B65H 35/0033 156/540 |
| 2012/0168090 | A1* | 7/2012 | Kropp .................. | B65H 37/007 156/577 |

FOREIGN PATENT DOCUMENTS

| | | | |
|---|---|---|---|
| JP | 9-300886 | H | 11/1997 |
| JP | 11-170775 | A | 6/1999 |
| JP | 11-170775 | H | 6/1999 |
| JP | 2003-276393 | A | 9/2003 |
| JP | 2010-246854 | A | 11/2010 |
| WO | 2002/026555 | A1 | 4/2002 |
| WO | 2009/059948 | A1 | 5/2009 |

OTHER PUBLICATIONS

Written Opinion dated Jan. 7, 2016 from PCT/FR2014/051873, 10 pages.

Japanese Office Action dated May 1, 2018 from corresponding Japanese Patent Application No. JP 2016-528585, 4 pages.

* cited by examiner

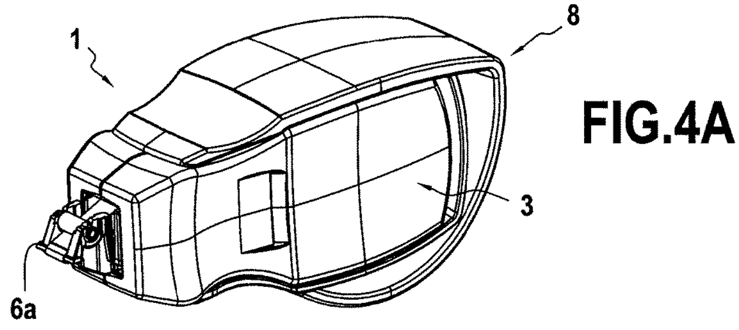
FIG.4A
FIG.4B
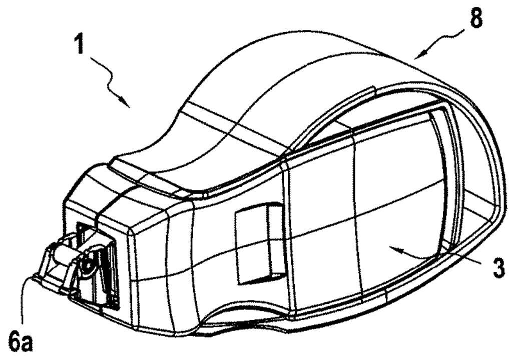
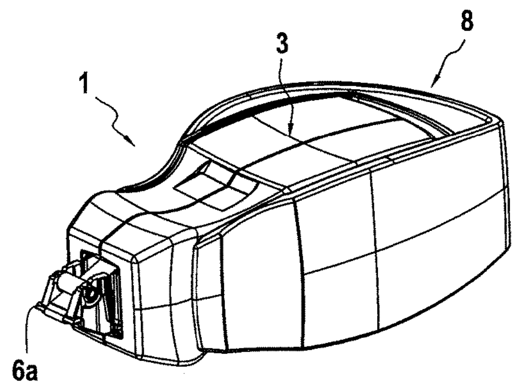
FIG.4C
FIG.4D
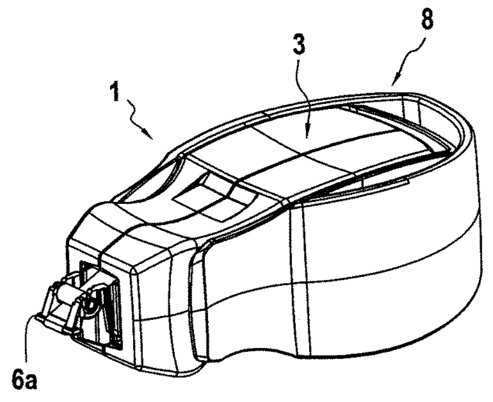

MANUAL APPLICATOR

CROSS REFERENCE TO RELATED APPLICATIONS

This application is a National Stage of International Application No. PCT/FR2014/051873, filed Jul. 21, 2014, that claims the benefit of French Patent Application No. 1357202, filed Jul. 22, 2013. The entire contents of International Application No. PCT/FR2014/051873, filed Jul. 21, 2014, and French Patent Application No. 1357202, filed Jul. 22, 2013, are incorporated herein by reference.

BACKGROUND OF THE INVENTION

The present invention relates to the field of manual applicators and more particularly office manual applicators for applying a film on a substrate such as a piece of paper. By way of example, the film may be an opaque correcting film, a colored translucent film, an adhesive film, etc.

Typically, manual applicators of this type comprise a housing and an applicator endpiece projecting beyond a front opening of the housing.

It has been observed that users have different ways in which they prefer to hold such applicators in the hand while using them. Thus, some users prefer to hold the applicator between a thumb and an index finger in a plane substantially parallel to a front edge of the applicator endpiece, while others prefer to hold it in a plane substantially perpendicular to the front edge. In addition, the applicator is also held differently depending on whether the user is right-handed or left-handed. Nevertheless, adapting the housing of the applicator to the holds preferred by various different potential users, including right-handed and left-handed users, is not only difficult, but runs the risk of excessively increasing its size and its material cost.

The specification of Japanese patent application JP H09 300886 A discloses an applicator comprising a housing, an applicator endpiece projecting beyond a front opening of the housing, and a C-shaped handle capable of pivoting between two different positions in order to provide two different holds. Nevertheless, the versatility of that applicator remains limited, in particular when seeking to adapt to the different holds of right-handed and left-handed users.

OBJECT AND SUMMARY OF THE INVENTION

The present disclosure seeks to remedy those drawbacks. In particular, it seeks to propose a manual applicator that can easily be adapted to being taken hold of in different ways when in use, while nevertheless retaining overall size and complexity that are limited.

In at least one embodiment, this object is achieved by the fact that in a first section plane and in at least one second section plane different from the first section plane and not parallel with the first section plane, said housing presents the same external outline adapted to be pressed into an internal outline of the handle, thereby enabling the handle to be fastened on said housing in a first orientation and alternatively in at least one second orientation different from the first orientation, the handle being oriented in the first section plane in the first orientation and in the second section plane in the second orientation, said first and second section planes being substantially in alignment with a longitudinal axis of the housing.

By means of these provisions, any user, whether right-handed or left-handed, can easily fasten the handle in the orientation that best matches that user's way of taking hold of the manual applicator, so as to adapt the grip angle around its longitudinal axis.

In particular for the purpose of enabling the manual applicator to be adapted to right-handed or left-handed users, said external outline of the housing may be substantially symmetrical, thus enabling the housing to be engaged in the handle in at least two opposite orientations.

In particular, the second section plane may be substantially perpendicular to the first section plane, even though other angles may also be envisaged.

In order to provide the film with a certain application width, the applicator endpiece needs to present a front edge that is substantially straight. The term "substantially straight" should be understood in this context to mean an edge that does not depart from a straight line anywhere along its width by more than 10% of its width, for example.

In particular in order to adapt the manual applicator to users who prefer to hold it width-wise, at least one of said section planes may be substantially parallel to said front edge of the applicator endpiece. Furthermore, in particular in order to adapt it to users who prefer to hold it height-wise, least one of said section planes may be substantially perpendicular to said front edge of the applicator endpiece.

The C-shaped handle may in particular comprise two longitudinal tabs and a transverse link segment, interconnecting the proximal ends of said longitudinal tabs. In order to stabilize the housing better, the applicator may include at least one protuberance on one of the handle and the housing, and a recess in the other one of the handle and the housing in order to snap-fasten the handle on the housing.

In particular for the purpose of reducing the weight and increasing the flexibility of the handle, the handle may include a cellular portion interposed between said internal outline and an external outline of the handle that is to be held by a user.

In particular for the purpose of enabling the configuration of the manual applicator to be modified subsequently, so as to match the preferences of another user, and/or in order to enable the handle to be reused with a new housing, the handle may be adapted to be releasably fastened on said housing.

Although a certain amount of rigidity may be required for ensuring that the handle is properly fastened on the housing, greater flexibility can be preferable for making it agreeable for a user to hold. In order to satisfy these two contradictory desires, the handle may comprise a more rigid first material and a more flexible second material, said first and second materials of the handle being suitable in particular for being co-injected. The greater rigidity of the first material enables elastic deformation of the internal outline to exert sufficient pressure on the external outline of the housing to provide good fastening, while the greater flexibility of the external outline provides agreeable touch for the user. The more rigid first material may in particular form a core of the handle and/or may be made of a metal material.

The material for transferring onto the substrate may in particular be in the form of a film. In order to make that possible, the applicator may include, inside the housing, a feed spool for feeding a tape carrying a film for transferring onto said substrate, and a pickup spool for picking up the carrier tape. The film may in particular be a correcting film. Nevertheless, other types of film may be used, such as for example adhesive films or colored translucent films.

BRIEF DESCRIPTION OF THE DRAWINGS

The invention can be well understood and its advantages appear better on reading the following detailed description of two embodiments shown as non-limiting examples. The description refers to the accompanying drawings, in which:

FIG. 4A is a perspective view of the manual applicator of the first embodiment with the handle in a first orientation on the housing;

FIG. 4B is a perspective view of the manual applicator of the first embodiment with the handle in a second orientation on the housing;

FIG. 4C is a perspective view of the manual applicator of the first embodiment with the handle in a third orientation on the housing;

FIG. 4D is a perspective view of the manual applicator of the first embodiment with the handle in a fourth orientation on the housing;

DETAILED DESCRIPTION OF THE INVENTION

Figure 1:
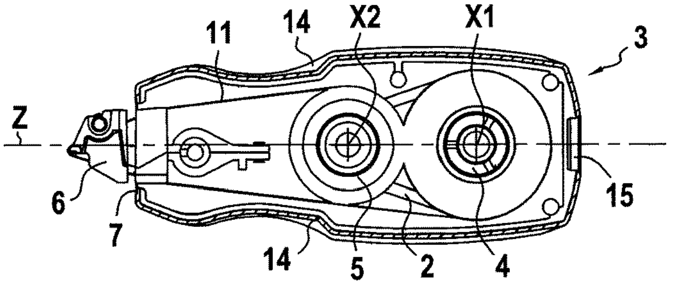
FIG. 1 is a longitudinal view of the housing of a manual applicator in a first embodiment of the present invention.

FIG. 1 shows the inside of a housing 3 of a manual applicator configured so as to enable a film to be transferred from a carrier tape 11 to a substrate. For this purpose, the applicator comprises, inside the housing 3, a feed spool 4 and a pickup spool 5 for the carrier tape. The applicator also has an applicator endpiece 6 projecting from a front opening 7 of the housing 3. The feed spool 4 is suitable for turning about a first axis of rotation $X_1$ in order to unwind the carrier tape. The carrier tape 11 is picked up by the pickup spool 5, which is suitable for rotating about a second axis of rotation $X_2$ that is substantially parallel to, but offset from, the first axis of rotation $X_1$. Between the feed spool 4 and the pickup spool 5, the carrier tape is guided in front of a front edge 6*a* of the applicator endpiece 6. Thus, pressing the endpiece 6 against a substrate (not shown) such as a sheet of paper, for example, causes the film to be transferred from an outside face of the carrier tape onto the substrate. Friction of the outside face of the carrier tape against the substrate exerts traction on the carrier tape between the endpiece 6 and the feed spool 4, thereby causing the carrier tape, which is wound around the feed spool 4, to be unwound progressively. The applicator also has a belt 2 for transmitting rotation from the feed spool 4 to the pickup spool 5, thereby maintaining tension on the carrier tape between the endpiece 6 and the pickup spool. Nevertheless, as an alternative, it is possible to use other transmission means for this function, such as for example gearing.

Figure 2:
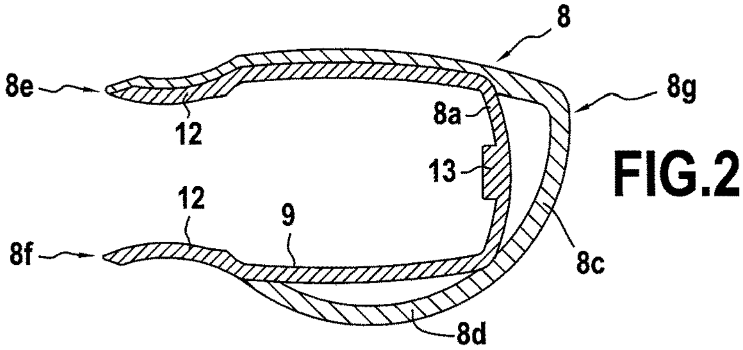
FIG. 2 is a longitudinal section view of a handle for fastening to the FIG. 1 housing in order to form a manual applicator in the first embodiment of the present invention.

FIG. 2 shows a handle 8 for releasably fastening on the housing 3. More specifically, the handle 8 is C-shaped with two longitudinal tabs 8*e* and 8*f* having proximal ends that are connected together by a transverse link segment 8*g*, which tabs present an internal outline 9 into which the housing 3 can be pressed. In this first embodiment, the internal outline 9 is formed in an inside portion 8*a* of the handle that is made of a relatively rigid material, and that is surrounded by an outside portion 8*d* of a material that is relatively flexible, presenting a grip surface 8*c* in order to facilitate a user gripping the handle 8. The terms “relatively rigid material” and “relatively flexible material” are used to mean that the first material presents a modulus of elasticity that is significantly greater than that of the second material. In this first embodiment, these two different materials may in particular both be thermoplastics, thus enabling the handle to be produced by injection molding, and in particular by co-injection of the two materials. Nevertheless, other materials and other production methods could also be envisaged.

As can be seen in FIG. 2, the internal outline 9 of the handle 8 is substantially symmetrical. The term “substantially symmetrical” is used in the present context to mean that this outline is as symmetrical as can be obtained at reasonable cost using the manufacturing technologies involved. In contrast, the external outline of the grip surface 8*c* is asymmetrical in order to make it particularly ergonomic to hold.

Figure 3A:
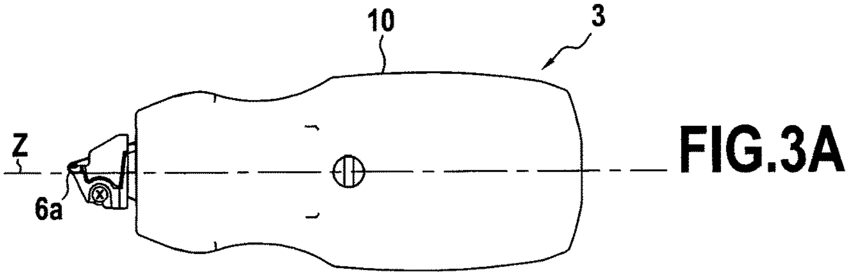
FIG. 3A is a side view of the FIG. 1 housing.
Figure 3B:
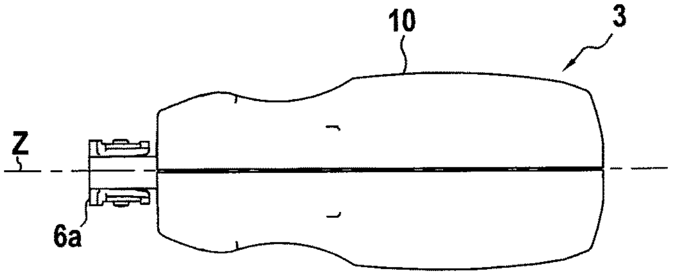
FIG. 3B is a top view of the FIG. 1 housing.

It can be seen in FIG. 3A that, in a longitudinal plane perpendicular to the front edge 6*a* of the applicator endpiece 6, the housing 3 presents an external outline 10 that is complementary to the internal outline 9 of the handle 8 and that is also substantially symmetrical. Thus, the housing 3 can be pressed into the inside of the handle 8 when oriented in this first plane. Nevertheless, and as can be seen in FIG. 3B, the housing 3 presents substantially the same external outline 10 in a longitudinal plane that is in alignment with the front edge 6*a* of the applicator endpiece 6. The housing 3 can thus also be pressed into the inside of the handle 8 in this second plane, perpendicular to the first. In addition, in both situations, since the external outlines 10 are symmetrical, the handle 8 can be fastened in two opposite alternative orientations in order to match the applicator endpiece 6 to users who are right-handed or left-handed.

In order to ensure that the handle 8 is fastened in stable manner on the housing 3, it presents protuberances 12, 13 respectively on the distal ends of the longitudinal tabs 8*e*, 8*f* and on the transverse link segments 8*g*. These protuberances 12 and 13 are oriented towards the inside of the handle 8 and they are configured so as to co-operate with complementary recesses 14 and 15 in the outside of the housing 3 in order to stabilize the handle 8 on the housing 3 by snap-fastening. Nevertheless, and alternatively, at least one of the protuberances could be situated on the housing and the handle could present a complementary recess.

FIG. 4A thus shows the applicator 1 with the handle 8 oriented in a longitudinal plane perpendicular to the front edge 6*a* of the applicator endpiece 6. In FIG. 4B, the handle 8 is likewise oriented in a longitudinal plane perpendicular to the front edge 6*a* of the applicator endpiece, but in an orientation that is opposite to that of FIG. 4A. In contrast, in FIG. 4C, the handle 8 is oriented in a longitudinal plane that is in alignment with the front edge 6*a* of the applicator endpiece 6. Finally, in FIG. 4D, the handle 8 is likewise oriented in a longitudinal plane that is in alignment with the front edge 6*a* of the applicator endpiece, but in an orientation that is opposite to that of FIG. 4C. In all four configurations, although the handle 8 is fastened to the housing 3 by forced locking due to its elastic deformation and the pressure it exerts on the external outline 10 and in the recesses 14, 15 of the housing 3, this connection is releasable, making it possible for the housing 3 to be replaced or to change the orientation of the handle 8 depending on the preferences of other users.

Figure 5:
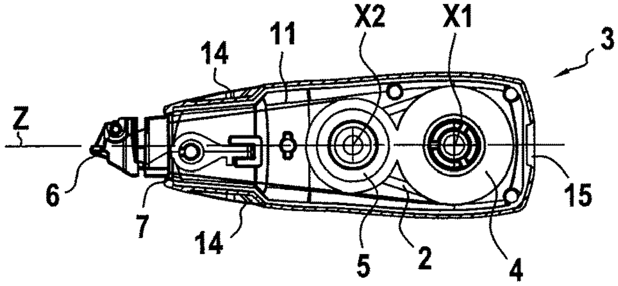
FIG. 5 is a longitudinal section view of a housing of a manual applicator in a second embodiment of the present invention.

FIG. 5 shows the housing 3 of an applicator 1 in a second embodiment. Although different in detail, this housing 3 is substantially analogous to the housing of the first embodiment and equivalent elements are given the same reference numbers in the drawings.

Figure 6:
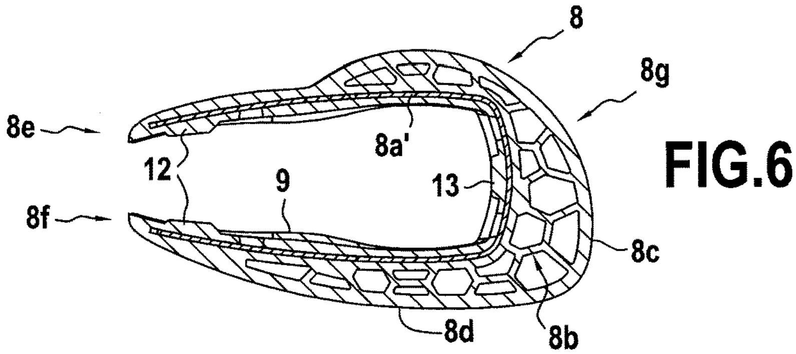
FIG. 6 is a longitudinal section view of a handle for fastening on the FIG. 5 housing in order to form a manual applicator in a second embodiment of the present invention.

In this second embodiment, the inside portion 8*a* of the handle 8, shown in FIG. 6, presents a core 8*a*' of relatively rigid material having overmolded thereon a relatively flexible material that also forms a cellular portion 8*b* and the outside portion 8*d* presenting the grip surface 8*c*. In this second embodiment, the core 8*a*' may be formed by at least one metal blade or cord folded into a C-shape with two tabs extending in the longitudinal tabs 8*e*, 8*f* of the handle 8. Nevertheless, other materials such as polymers or composites could equally well be considered for the core 8*a*'. The relatively flexible material that is overmolded on the core may in particular be a thermoplastic, thus enabling the handle to be produced by injection molding. Nevertheless, as an alternative, at least one of the protuberances could be situated on the housing and the handle could present a complementary recess.

The remaining elements of the handle 8 in this second embodiment are equivalent to those of the first embodiment and are therefore given the same reference numbers as in the figures showing the first embodiment.

Figure 7A:
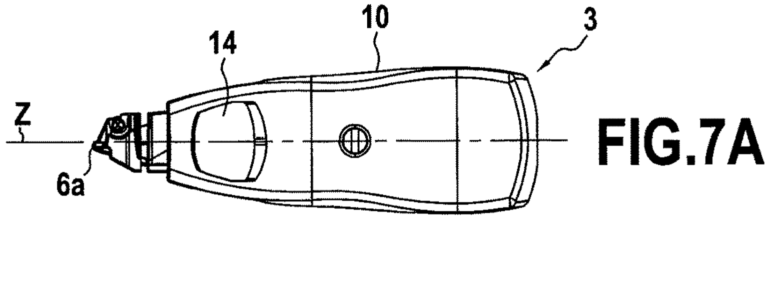
FIG. 7A is a side view of the FIG. 5 housing.
Figure 7B:
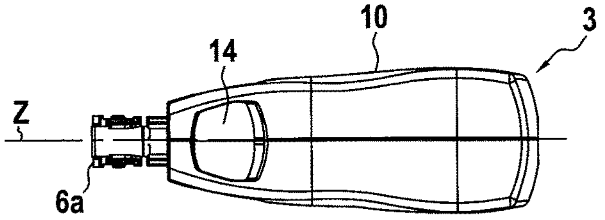
FIG. 7B is a top view of the FIG. 5 housing.
Figure 8A:
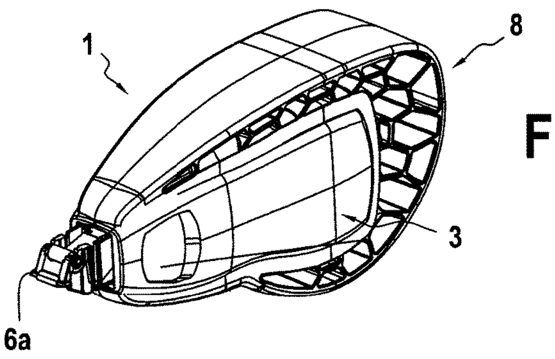
FIG. 8A is a perspective view of the manual applicator of the second embodiment with the handle in a first orientation on the housing.
Figure 8B:
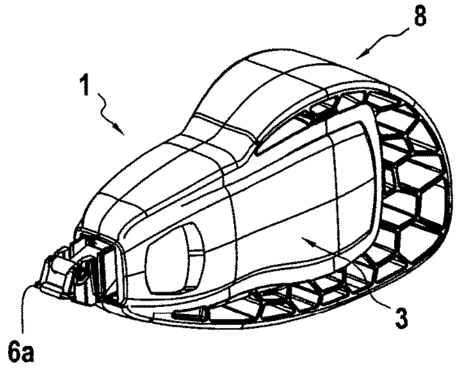
FIG. 8B is a perspective view of the manual applicator of the second embodiment with the handle in a second orientation on the housing.
Figure 8C:
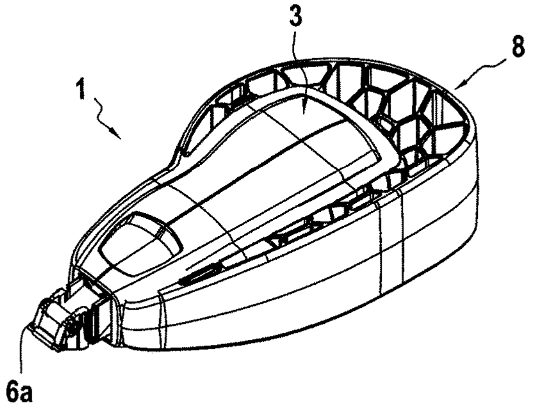
FIG. 8C is a perspective view of the manual applicator of the second embodiment with the handle in a third orientation on the housing.
Figure 8D:
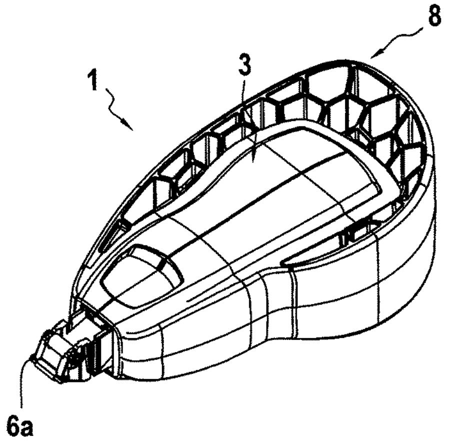
FIG. 8D is a perspective view of the manual applicator of the second embodiment with the handle in a fourth orientation on the housing.

FIGS. 7A and 7B show how the housing 3 in this second embodiment also presents substantially the same external outline in a first longitudinal section plane and in a second longitudinal section plane perpendicular to the first.

In a manner analogous to FIGS. 4A to 4D, FIGS. 8A to 8D show how the handle 8 of this second embodiment can thus likewise be fastened in releasable manner in the same orientations as in the first embodiment.

Although the present invention is described with reference to specific embodiments, it is clear that various modifications and changes can be made to those embodiments without going the general ambit of the invention as defined by the claims. In particular, although the invention is described with reference to a manual applicator having a carrier tape, it is equally applicable to other types of applicator, e.g. including applicators having an internal supply of fluid material and a porous applicator endpiece. In addition, individual characteristics of the various embodiments mentioned may be combined in additional embodiments. Consequently, the description and the drawings should be considered in a sense that is illustrative rather than restrictive.

The invention claimed is:

1. A manual applicator for applying a material on a substrate such as a sheet of paper, said manual applicator comprising:

a housing;

an applicator endpiece projecting beyond a front opening of the housing; and a handle that is C-shaped;

wherein, in a first section plane and in at least one second section plane different from the first section plane and not parallel with the first section plane, said housing presents the same external outline adapted to be pressed into an internal outline of the handle, thereby enabling the handle to be fastened on said housing in a first orientation and alternatively in at least one second orientation different from the first orientation, the handle being oriented in the first section plane in the first orientation and in the second section plane in the second orientation, said first and second section planes being substantially in alignment with a longitudinal axis of the housing.

2. The manual applicator according to claim 1, wherein said external outline of the housing is substantially symmetrical.

3. The manual applicator according to claim 1, wherein said first and second section planes are substantially perpendicular to each other.

4. The manual applicator according to claim 1, wherein the applicator endpiece presents a front edge that is substantially straight.

5. The manual applicator according to claim 4, wherein at least one of said first section plane and said second section plane is substantially parallel to said front edge of the applicator endpiece.

6. The manual applicator according to claim 4, wherein at least one of said first section plane and said second section plane is substantially perpendicular to said front edge of the applicator endpiece.

7. The manual applicator according to claim 1, wherein said handle has two longitudinal tabs and a transverse link segment, interconnecting the proximal ends of said longitudinal tabs.

8. The manual applicator according to claim 1, including at least one protuberance on one of the handle and the housing, and a recess in the other one of the handle and the housing in order to snap-fasten the handle on the housing.

9. The manual applicator according to claim 1, wherein said handle includes a cellular portion interposed between said internal outline and a grip surface of the handle.

10. The manual applicator according to claim 1, wherein said handle is suitable for being releasably fastened on said housing.

11. The manual applicator according to claim 1, wherein said handle comprises a first material that is more rigid and a second material that is more flexible.

12. The manual applicator according to claim 11, wherein the first material forms a core of the handle.

13. The manual applicator according to claim 12, wherein said first material is a metal material.

14. The manual applicator according to claim 11, wherein said first and second materials of the handle are co-injected.

15. The manual applicator according to claim 1, further comprising, inside the housing, a feed spool for feeding a tape carrying a film for transferring onto said substrate, and a pickup spool for picking up the carrier tape.

16. The manual applicator according to claim 15, wherein said film is a correcting film.

* * * * *